United States Patent Office 3,255,268
Patented June 7, 1966

3,255,268
SUBSTITUTED ADAMANTANES HAVING A VINYL SUBSTITUENT
George Suld, Springfield, Pa., and Robert E. Moore, Wilmington, Del., assignors to Sun Oil Company, Philadelphia, Pa., a corporation of New Jersey
No Drawing. Filed May 12, 1964, Ser. No. 366,886
14 Claims. (Cl. 260—666)

This invention relates to adamantane derivatives of the $C_{12}$–$C_{15}$ range having a vinyl substituent at a bridgehead position. More specifically the invention concerns novel $C_{12}$–$C_{15}$ adamantane hydrocarbons which have one vinyl group attached to a bridgehead carbon atom and from none to three methyl groups as additional substituents on the adamantane nucleus. The invention also embraces the preparation of these substituted adamantanes from the corresponding alkyl adamantanes having a bridgehead ethyl group.

The carbon nucleus of adamantane contains ten carbon atoms arranged in a completely symmetrical, strainless manner such that there are four condensed, six-membered rings and four bridgehead carbon atoms. The structure of adamatane ($C_{10}H_{16}$) is commonly depicted typographically as follows:

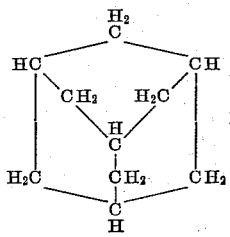

Numerous derivatives of adamantane have been prepared heretofore, as may be seen by reference to a review article by H. Stetter appearing in Agnew. Chem. Internat. Edit., vol. I (1962), No. 6, pages 286–298. However, the preparation of a derivative having a vinyl group attached to the adamantane nucleus does not appear to have been achieved heretofore. One attempt to produce vinyladamantane, as reported by Stetter et al. in Chem. Ber., vol. 93, pages 2054–2056 (1960), was unsuccessful. In this procedure an attempt was made to dehydrate 1-adamantyl-1-hydroxyethane but no vinyladamantane was obtained. This result would seem to indicate that the adamantane nucleus somehow exerts an inhibitory effect against the formation of a vinyl group adjacent thereto.

The present invention provides a method for preparing 1-vinyladamantanes having 12–15 carbon atoms and 0–3 methyl groups in addition to the vinyl group. We have now discovered that such compounds can be obtained by subjecting the corresponding ethyl-substituted hydrocarbons to dehydrogenating conditions in the presence of a dehydrogenation catalyst. More specifically these ethyl-substituted charge hydrocarbons are 1-ethyladamatane and 1-ethyladmantanes having from one to three methyl substituents. The dehydrogenating conditions include a temperature in the range of 480–580° C., preferably 500–550° C., and a hydrocarbon partial pressure below atmospheric, i.e., below 760 mm. Hg absolute. Preferably the hydrocarbon partial pressure is in the range of 10–200 mm. Hg absolute. Under such conditions and in the presence of a suitable dehydrogenation catalyst the ethyl group in the charge hydrocarbon undergoes dehydrogenation and is converted to a vinyl group. A 1-vinyl derivative having the same carbon skeletal arrangement as the starting hydrocarbon is thus produced and can thereafter be separated from the reaction mixture.

Specific vinyl compounds that can be made in accordance with the invention are as follows:

1-vinyladamantane
1-vinyl-3-methyladamantane
1-vinyl-3,5-dimethyladamantane
1-vinyl-3,5,7-trimethyladamantane Each of these is formed by dehydrogenation of the corresponding 1-ethyl substituted compound. The methyl-substituted compounds listed all have their methyl substituents at bridgehead positions on the adamantane nucleus. However it is also within the scope of the invention to produce 1-vinyladamantanes having one or more methyl groups at non-bridgehead positions. For example, dehydrogenation of 1-ethyl-3,4-dimethyladamantane will yield 1-vinyl-3,4-dimethyladamantane in which one of the two methyl groups is located at a non-bridgehead position.

Ethyl-substituted adamantanes for use as starting material in practicing the present invention can most conveniently be prepared by the procedure described and claimed in Janoski and Moore application U.S. Serial No. 359,401 filed April 13, 1964. This procedure involves isomerizing tricyclic perhydroaromatic hydrocarbons having 12–15 carbon atoms by means of an HF-BF$_3$ catalyst at, for example, 75–125° C. and stopping the isomerization reaction at the proper stage. Any tricyclic perhydroaromatic of the $C_{12}$–$C_{15}$ range can be converted in this manner to an ethyl-substituted adamantane in which the ethyl group is positioned mainly at a bridgehead carbon atom. For example, perhydroacenaphthene ($C_{12}$) can be converted to 1-ethyladamantane, perhydrofluorene ($C_{13}$) can be converted to 1-ethyl-methyladamantane, perhydroanthracene ($C_{14}$) can be converted to 1-ethyl-dimethyladamantane, and perhydromethylphenanthrene can be converted to 1-ethyl-trimethyladamantane. The methyl groups in such products will be located mainly at bridgehead positions. Preparation of the ethyl-substituted compounds depends upon stopping the reaction before the isomerization has run its full course, as otherwise the ethyl group will convert to two methyl groups and the product will be polymethyladamantanes having no ethyl substituent. After stopping the reaction the etheyl-substtuted derivative can be separated from the reaction mixture by fractional distillation and then used as charge material for practicing the present invention.

Dehydrogenation of the ethyl-substituted adamantane charge material is, as previously indicated, carried out in the presence of a dehydrogenation catalyst at a temperature in the range of 480–580° C. and preferably 500–550° C. Suitable catalysts for effecting this conversion in general comprise alumina in combination with a dehydrogenating component which can be either of the following types:

(1) Oxides of Group VIb metals, i.e., chromium, molybdenum and tungsten)

(2) Group VIII metals selected from nickel, platinum and palladium.

Such dehydrogenation catalysts are well known in the art and have been used in other dehydrogenation reactions such as in the conversion of butane to butadiene. The preferred type of catalyst for the present purpose is chromia-alumina. The preparation of catalysts of this type is well known and has been described, for example, in United States Patent No. 2,217,865 and No. 2,236,514 and the use of various chromia-alumina dehydrogenation catalysts in the conversion of paraffins to olefins is discussed in The Chemistry of Petroleum Hydrocarbons, edited by Benjamin T. Brooks et al., vol. 2, pages 226–232 1955). Chromia-alumina catalysts are available commercially, generally containing of the order of 10–

25% $Cr_2O_3$ by weight, and these are the preferred catalysts for practicing the invention.

Commercially available reforming catalysts comprising platinum-on-alumina are an example of catalysts containing a Group VIII metal as the dehydrogenating component. These catalysts normally have a substantial amount of cracking activity which is undesirable for the present purpose, and hence they should be treated in a manner to reduce or eliminate the cracking activity prior to use in the present process. This can be done by treating the commercially available form of catalyst with an aqueous solution of an alkali metal basic salt and then heating the catalyst to remove the water. Preferably lithium carbonate is used for this purpose and the amount thereof incorporated in the catalyst is preferably an amount that is equivalent to 1–5% lithium by weight. The resulting catalyst will have reduced cracking activity and can be employed in the present process.

The conditions of dehydrogenation in the present process are such that the partial pressure of the hydrocarbon material in the reaction zone is subatmospheric and preferably is in the range of 10–200 mm. Hg absolute. One way of maintaining the low partial pressure condition is by operating under vacuum in the reaction zone. Alternatively the low partial pressure can be maintained by diluting the hydrocarbon feed vapor with an inert gas such as steam or nitrogen, or with a refractory hydrocarbon such as benzene, and maintaining the total pressure in the reaction zone at about atmospheric. The liquid hourly space velocity of the hydrocarbon feed generally should be in the range of 0.1–5.0 and more preferably 0.2–2.0.

In addition to the dehydrogenation reaction some amount of cracking generally occurs in the reaction zone. The effluent from the reactor thus is a mixture of the desired vinyl-substituted adamantane product, unconverted charge material and lower boiling products resulting from cracking. The latter can readily be separated from the desired product and the unconverted material by fractional distillation. Separation of the vinyl-substituted product from the ethyl-substituted charge material, however, requires more stringent fractionating conditions since the vinyl-substituted product generally will boil only about 5° C. higher than the charge. Nevertheless this separation can be effected by superfractionation to recover the unconverted material and to obtain the desired vinyl-substituted adamantane in purified form. The recovered charge material can be recycled back to the dehydrogenation zone for further conversion.

All of the $C_{12}$–$C_{15}$ vinyl-substituted admantanes of the present invention are colorless liquids having freezing points below 0° C. Their boiling points are approximately 5° C. higher than the boiling points of the corresponding ethyl-substituted charge material. The following are approximations of the boiling points at atmospheric pressure for 1-vinyladamantane and its higher homologues which have methyl groups located at bridgehead positions:

| | Boiling point, ° C. |
|---|---|
| 1-vinyladamantane | 224 |
| 1-vinyl-3-methyladamantane | 230 |
| 1-vinyl-3,5-dimethyladamantane | 233 |
| 1-vinyl-3,5,7-trimethyladamantane | 240 |

In vapor phase chromatography of the reaction products of the present process, each of these compounds exhibits a somewhat longer retention time than its parent hydrocarbon and appears as a separate peak. Analyses by infrared and nuclear magnetic resonance confirm the presence of the vinyl group at a bridgehead position and, in the case of the higher homologues, of a methyl group or groups at other bridgehead positions.

The vinyl-substituted compounds prepared in accordance with the invention have utility as intermediates in the preparation of various compounds which generally cannot be made directly from ethyl-substituted adamantanes. These compounds are ones having various types of functional groups attached to the $C_2$ substituent rather than to carbon atoms of the adamantane nucleus. For example, bromination of 1-ethyladamantane causes bromine substitution preferentially at one or more of the bridgehead positions on the nucleus, and hence bromination of the $C_2$ substituents only cannot be effected. On the other hand, 1-vinyladamantane or its methyl-containing homologues obtained by the present invention can be reacted with hydrogen bromide to effect bromination at the vinyl group. In the absence of a catalyst such bromination will take place at the alpha carbon atom, while by using a peroxide catalyst the bromine can be made to attach at the beta carbon atom. The bromine derivative can then be converted, by Grignard reaction followed by carbonation, to (1-adamantyl)-2-propanoic acid or (1-adamantyl)-3-propanoic acid. Numerous other examples could be given where derivatives having functional groups attached to the side chain can be prepared whereas such compounds could not otherwise be readily made from the ethyladamantanes themselves. Inasmuch as adamantane derivatives have recently given promise of wide applicability in the pharmaceutical and medicinal fields as evidenced, for example, by United States Patent No. 3,081,337 and No. 3,096,372, the present invention provides a simplified route to numerous derivatives of potential utility for such purposes.

The following examples are specific illustrations of the invention:

Example I

A bed of commercial chromia-alumina catalyst is utilized for dehydrogenating 1-ethyladamantane in a tubular reactor. The charge compound had previously been prepared by completely hydrogenating acenaphthene, treating the perhydro product with HF-$BF_3$ at a temperature of 85° C. for 6 hours and then separating the 1-ethyladamantane from the reaction product. The chromia-alumina catalyst used for the dehydrogenation has a $Cr_2O_3$ content of about 20% by weight and a mesh size of 10–20 (U.S. Sieve Series). The reaction is carried out by feeding a mixture of the ethyladamantane and benzene (1:1 by volume) to the catalyst bed maintained at 565° C. and also passing therethrough a stream of nitrogen. The total pressure in the reactor is about atmospheric and the partial pressure of the ethyladamantane is about 106 mm. Hg absolute. The liquid hourly space velocity with respect to the thyladamantane only is 0.25. Effluent from the reaction zone is condensed, benzene is then distilled therefrom and the resulting product is analyzed by vapor phase chromatography and found to have the following composition:

| | Percent |
|---|---|
| 1-ethyladamantane | 64 |
| 1-vinyladamantane | 16 |
| Other products | 20 |

The material listed as "other products" is a result of cracking and is not specifically identified. The effluent from the chromatograph which constitutes the 1-vinyladamantane is collected and analyzed by infrared and nuclear magnetic resonance spectroscopy. Its infrared spectrum shows strong bands at 10.03$\mu$ and 11.05$\mu$ showing the presence of the vinyl group and the overall spectrum is characteristic of 1-substituted adamantane. The nuclear magnetic resonance spectrum also confirms its identification.

Example II

Another dehydrogenation run is made using the same type of catalyst as in the preceding example and also charging a 1:1 mixture of 1-ethyladamantane and benzene. In this case, however, the temperature in the reactor is reduced to about 520° C., no nitrogen is added, the liquid hourly space velocity with respect to ethyladamantane is increased to 0.6, and the total pressure is reduced to 200 mm. Hg absolute corresponding to a partial pressure of the ethyladamantane of 70 mm. Hg absolute. Analysis of the product shows the following results:

| | Percent |
|---|---|
| 1-ethyladamantane | 61.8 |
| 1-vinyladamantane | 27.7 |
| Other products | 10.5 |

In this case the ratio of the desired vinyl-substituted product to the products of cracking is about 2.6 as compared to 0.8 for the conditions of Example I.

*Example III*

Another run is made using the same catalyst and under the same conditions as in Example II except that the ethyladamantane liquid hourly space velocity is increased to 0.9 and the temperature is reduced to 510° C. The following results are obtained:

| | Percent |
|---|---|
| 1-ethyladamantane | 75.2 |
| 1-vinyladamantane | 18.3 |
| Other products | 6.5 |

Under these conditions the ratio of vinyladamantane to other products produced is 2.85.

*Example IV*

Another type of dehydrogenation catalyst is prepared by impregnating a commercial platinum-on-alumina reforming catalyst with an aqueous solution of $LiCO_3$ and thereafter drying. The resulting catalyst, which contains 2.4% lithium and 0.7% platinum, is used for dehydrogenating 1-ethyladamantane at a temperature of 520° C. No solvent is added to the hydrocarbon charge and the latter is fed to the catalyst bed in a stream of gaseous hydrogen. The reactor is maintained at about atmospheric pressure corresponding to a hydrocarbon partial pressure of 235 mm. Hg absolute. Liquid hourly space velocity of the hydrocarbon feed is 0.5. Analysis of the product gives the following results:

| | Percent |
|---|---|
| 1-ethyladamantane | 90 |
| 1-vinyladamantane | 5 |
| Other products | 5 |

These results indicate that the platinum-alumina type of catalyst is not as effective as the cromia-alumina catalysts employed in the preceding examples.

When 1-ethyladamantanes having one, two or three methyl substituents are substituted for the ethyladamantane of the foregoing examples, substantially similar results are obtained. However, the ratio of the desired vinyl-substituted product to the products of cracking tends to decrease as the number of methyl groups in the feed hydrocarbon increases.

We claim:
1. Method of preparing vinyl-substituted adamantanes which comprises contacting a $C_{12}$–$C_{15}$ alkyladamantane selected from the group consisting of 1-ethyladamantane and 1-ethyladamantanes having from one to three methyl substituents at a temperature in the range of 480–580° C. and at a hydrocarbon partial pressure below 760 mm. Hg absolute with a dehydrogenation catalyst having a dehydrogenating component selected from the group consisting of (1) oxides of Group VI*b* metals and (2) a Group VIII metal selected from nickel, platinum and palladium, and separating from the reaction mixture a vinyl-substituted adamantane corresponding to the alkyladamantane charged.

2. Method according to claim 1 wherein the temperature is in the range of 500–550° C. and the hydrocarbon partial pressure is in the range of 10–200 mm. Hg absolute.

3. Method according to claim 1 wherein the dehydrogenation catalyst is a cromia-alumina catalyst.

4. Method according to claim 1 wherein said alkyladamantane is 1-ethyladamantane and 1-vinyladamantane is separated from the reaction mixture.

5. Method according to claim 4 wherein the dehydrogenation catalyst is a chromia-alumina catalyst, the temperature is in the range of 500–550° C. and the hydrocarbon partial pressure is in the range of 10–200 mm. Hg absolute.

6. Method according to claim 1 wherein said alkyladamantane is 1-ethyl-3-methyladamantane and 1-vinyl-3-methyladamantane is separated from the reaction mixture.

7. Method according to claim 6 wherein the dehydrogenation catalyst is a chromia-alumina catalyst, the temperature is in the range of 500–550° C. and the hydrocarbon partial pressure is in the range of 10–200 mm. Hg absolute.

8. Method according to claim 1 wherein said alkyladamantane is 1-ethyl-3,5-dimethyladamantane and 1-vinyl-3,5-dimethyladamantane is separated from the reaction mixture.

9. Method according to claim 8 wherein the dehydrogenation catalyst is a cromia-alumina catalyst, the temperature is in the range of 500–550° C. and the hydrocarbon partial pressure is in the range of 10–200 mm. Hg absolute.

10. Method according to claim 1 wherein said alkyladamantane is 1-ethyl-3,5,7-trimethyladamantane and 1-vinyl-3,5,7-trimethyladamantane is separated from the reaction mixture.

11. 1-vinyladamantane.
12. 1-vinyl-3-methyladamantane.
13. 1-vinyl-3,5-dimethyladamantane.
14. 1-vinyl-3,5,7-trimethyladamantane.

References Cited by the Examiner
UNITED STATES PATENTS

| 2,823,239 | 2/1958 | Lang | 260—666 |
| 3,128,316 | 4/1964 | Schneider | 260—666 |

OTHER REFERENCES

Hermann Stetter et al., Chem. Ber., vol. 93, pp. 2054–2057, 1960.

Ind. Eng. Chem., vol. 38, pp. 1041–1045, 1946.

Raymond C. Fort, Jr., et al., Chem. Der., vol. 64, No. 3, pp. 277–300, 1964.

The Chemistry of Petroleum Hydrocarbons, edited by Benjamin T. Brooks et al., Reinhold Publishing, vol. II.

DELBERT E. GANTZ, *Primary Examiner.*

V. O'KEEFE, *Assistant Examiner.*